(12) United States Patent
Dubord

(10) Patent No.: US 8,061,868 B2
(45) Date of Patent: Nov. 22, 2011

(54) ADJUSTABLE LED LIGHTING SYSTEM, KIT AND METHOD OF USING SAME

(76) Inventor: Jack Dubord, Escondido, CA (US)

( * ) Notice: Subject to any disclaimer, the term of this patent is extended or adjusted under 35 U.S.C. 154(b) by 414 days.

(21) Appl. No.: 12/386,545

(22) Filed: Apr. 20, 2009

(65) Prior Publication Data

US 2009/0296390 A1 Dec. 3, 2009

Related U.S. Application Data

(60) Provisional application No. 61/057,858, filed on Jun. 1, 2008.

(51) Int. Cl.
*F21V 14/06* (2006.01)
*F21V 17/04* (2006.01)
*B60Q 1/26* (2006.01)

(52) U.S. Cl. ........ 362/232; 362/244; 362/277; 362/283; 362/319; 362/322; 362/455

(58) Field of Classification Search .................. 362/232, 362/244, 199, 249.03, 455
See application file for complete search history.

(56) References Cited

U.S. PATENT DOCUMENTS

| | | | |
|---|---|---|---|
| 5,633,629 A | 5/1997 | Hochstein | |
| 6,783,258 B2 | 8/2004 | Ryan, Jr. | |
| 6,799,864 B2 * | 10/2004 | Bohler et al. | 362/294 |
| 6,866,401 B2 * | 3/2005 | Sommers et al. | 362/232 |
| 6,877,875 B2 * | 4/2005 | Yu et al. | 362/245 |
| 6,902,308 B2 | 6/2005 | Love | |
| 6,979,100 B2 * | 12/2005 | Reiff et al. | 362/244 |
| 6,979,104 B2 * | 12/2005 | Brass et al. | 362/244 |
| 7,226,185 B2 * | 6/2007 | Dolgin et al. | 362/455 |
| 2008/0080179 A1 * | 4/2008 | Giorgi | 362/232 |

* cited by examiner

*Primary Examiner* — Alan Cariaso
(74) *Attorney, Agent, or Firm* — Jerry R. Potts

(57) ABSTRACT

A light emitting diode lighting system and kit includes a plurality of matched pairs of breakaway light emitting diode assemblies adapted to be mounted in a primary lamp holder where each individual matched pair assembly includes: (1) a light emitting diode coupled to a printed circuit board; (2) a break away housing adapted to be pressed fit over the light emitting diode; and (3) a breakaway lens adapted to be pressed fit into the housing to facilitate controlling the spread of light emitted by said light emitting diode from a wide range angle Ø to a narrow range angle β at a user selected breakaway angle θ of between about A degrees to about B degrees.

22 Claims, 8 Drawing Sheets

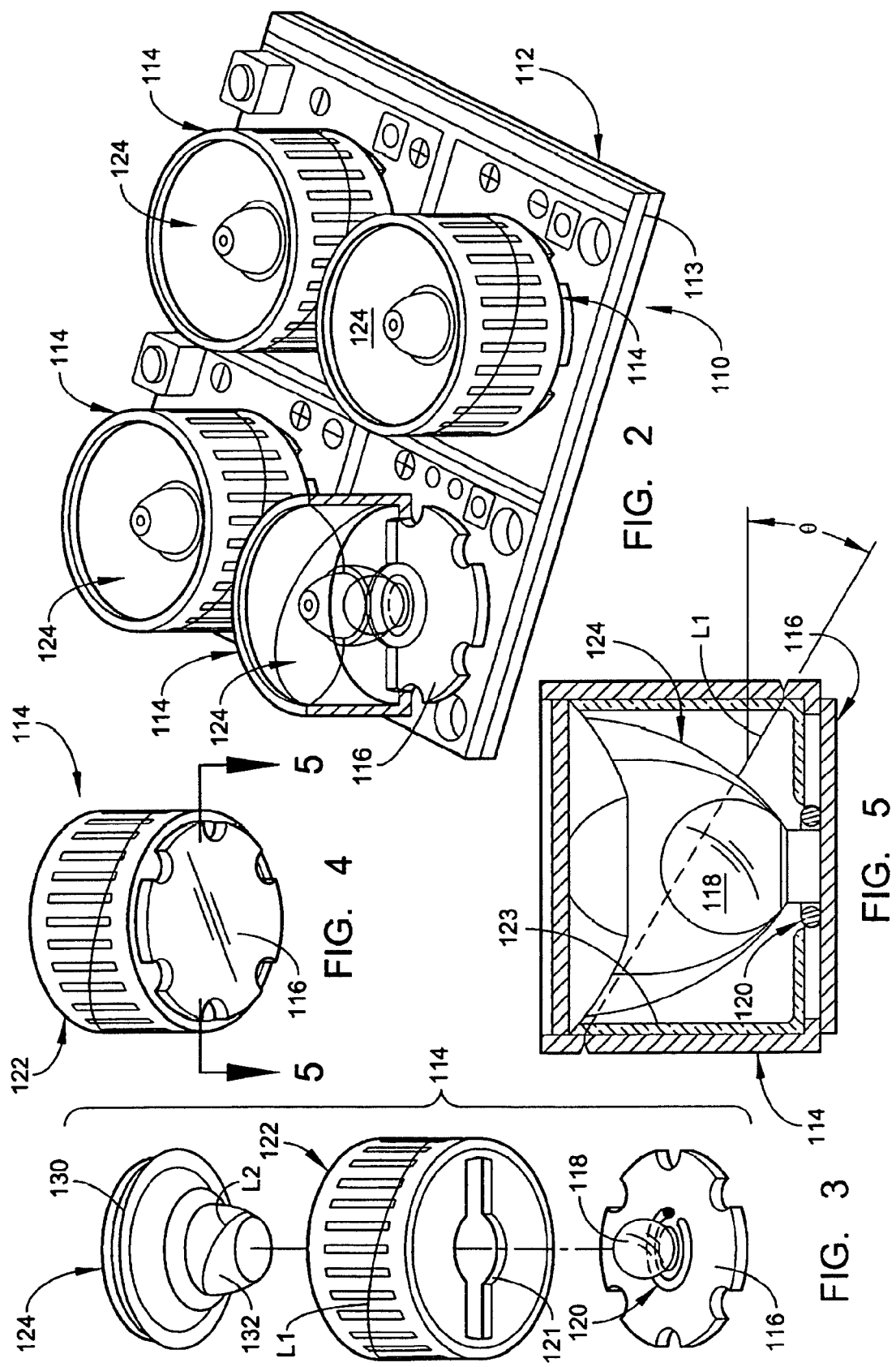

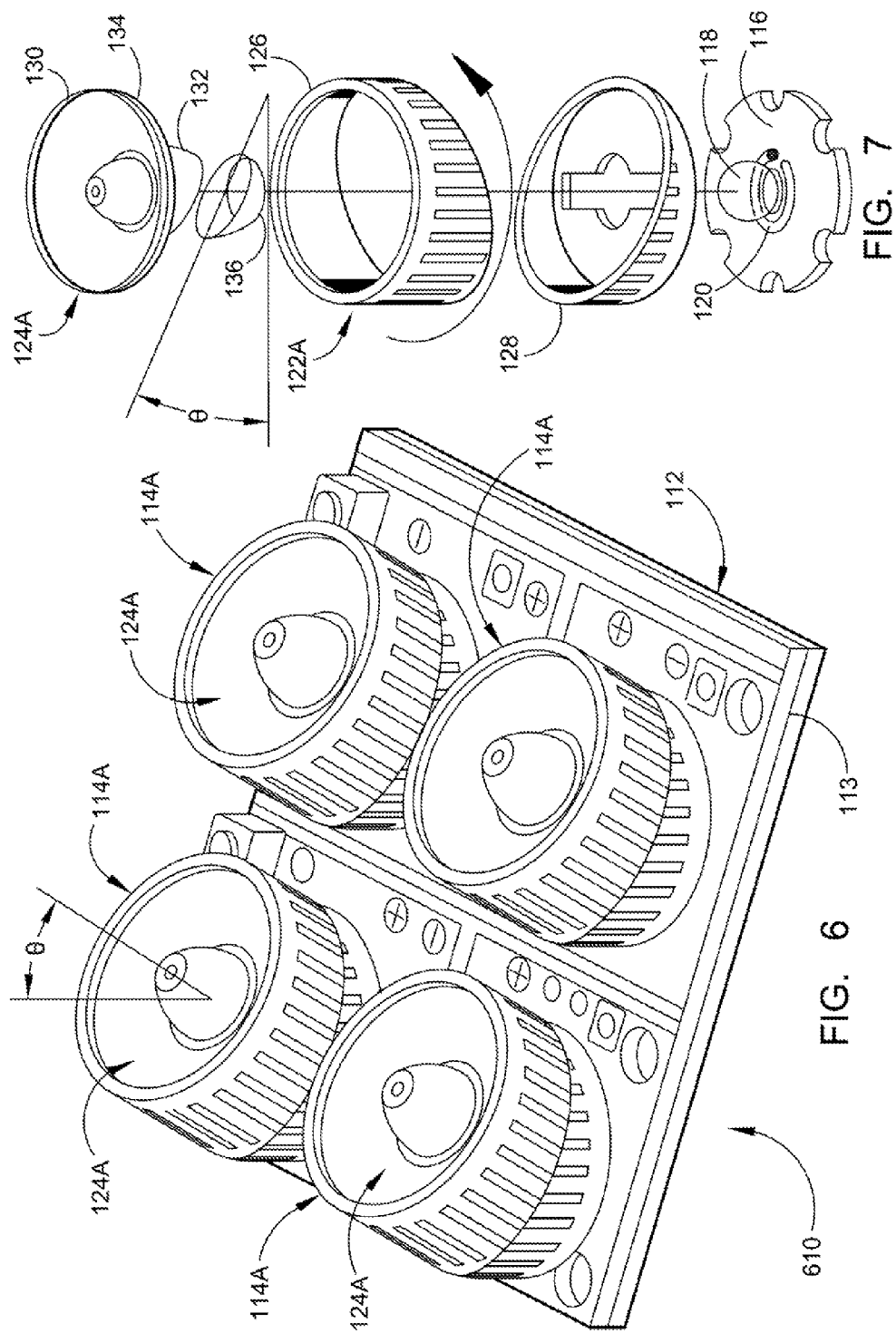

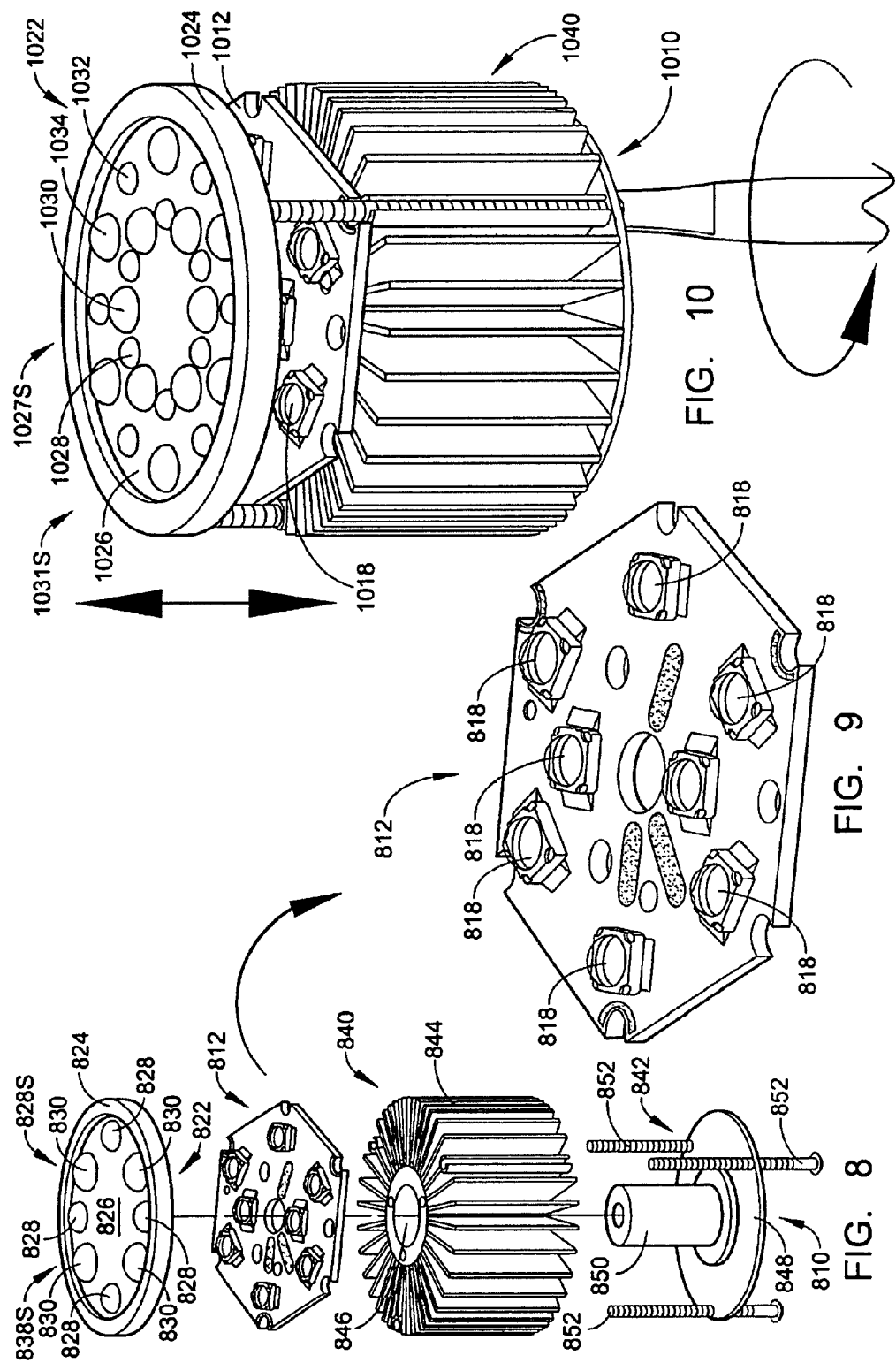

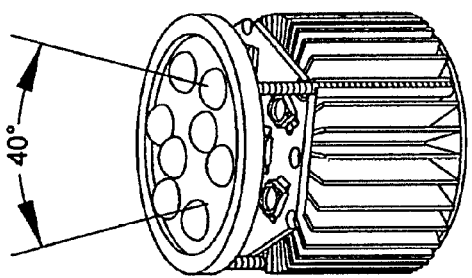
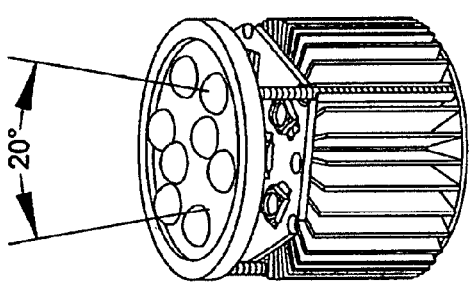
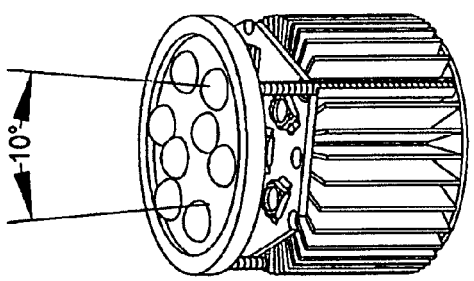
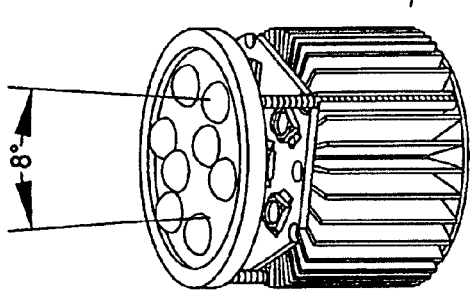
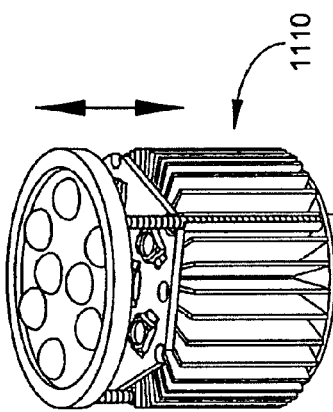
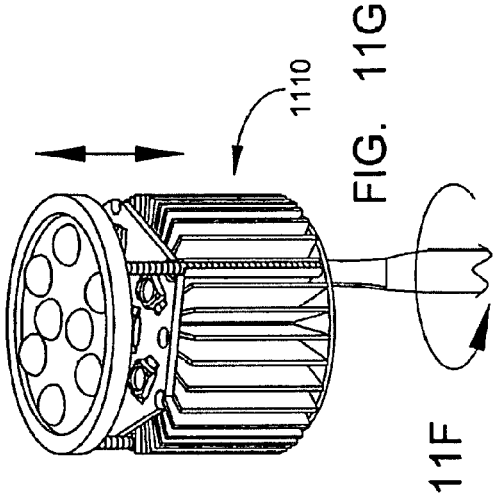
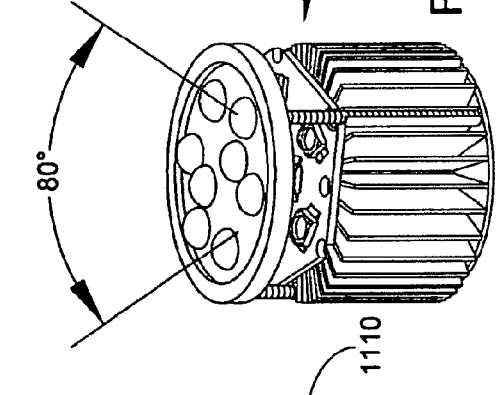

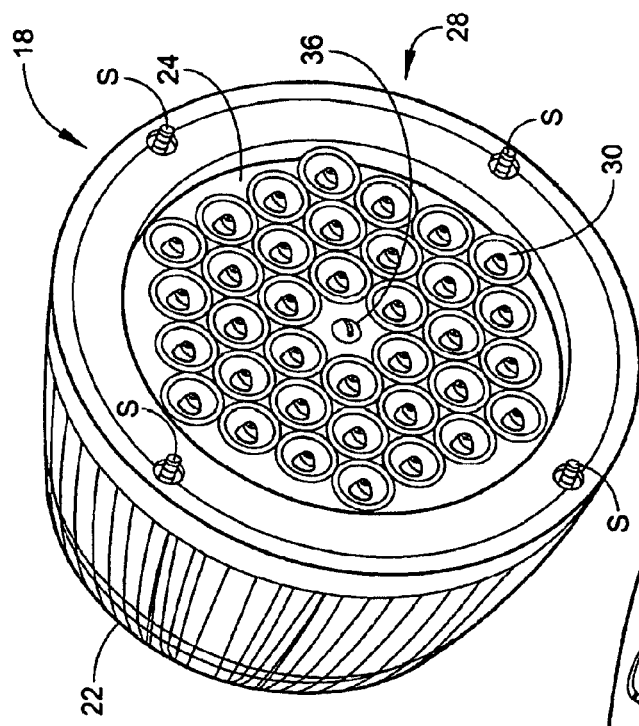
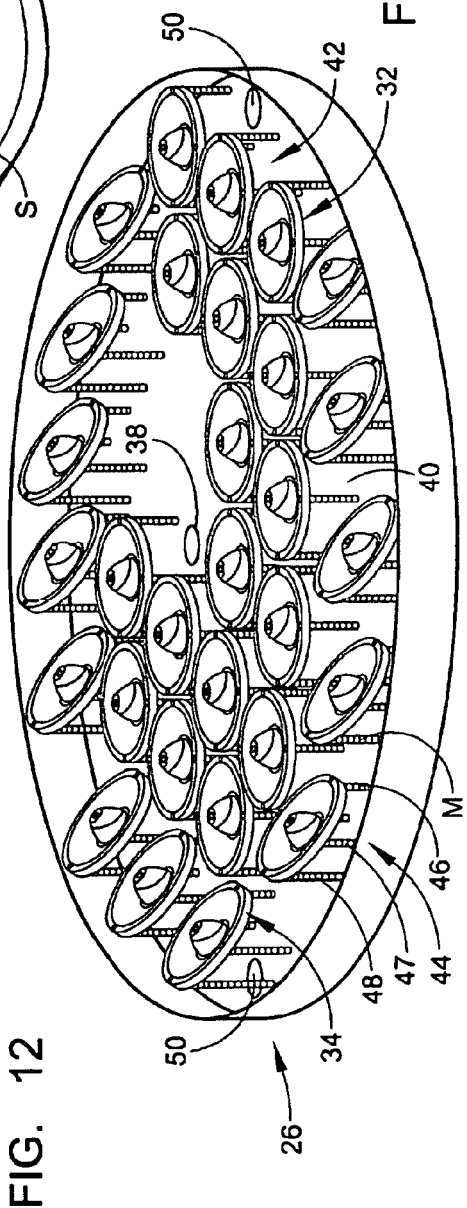
FIG. 13
FIG. 14
FIG. 12

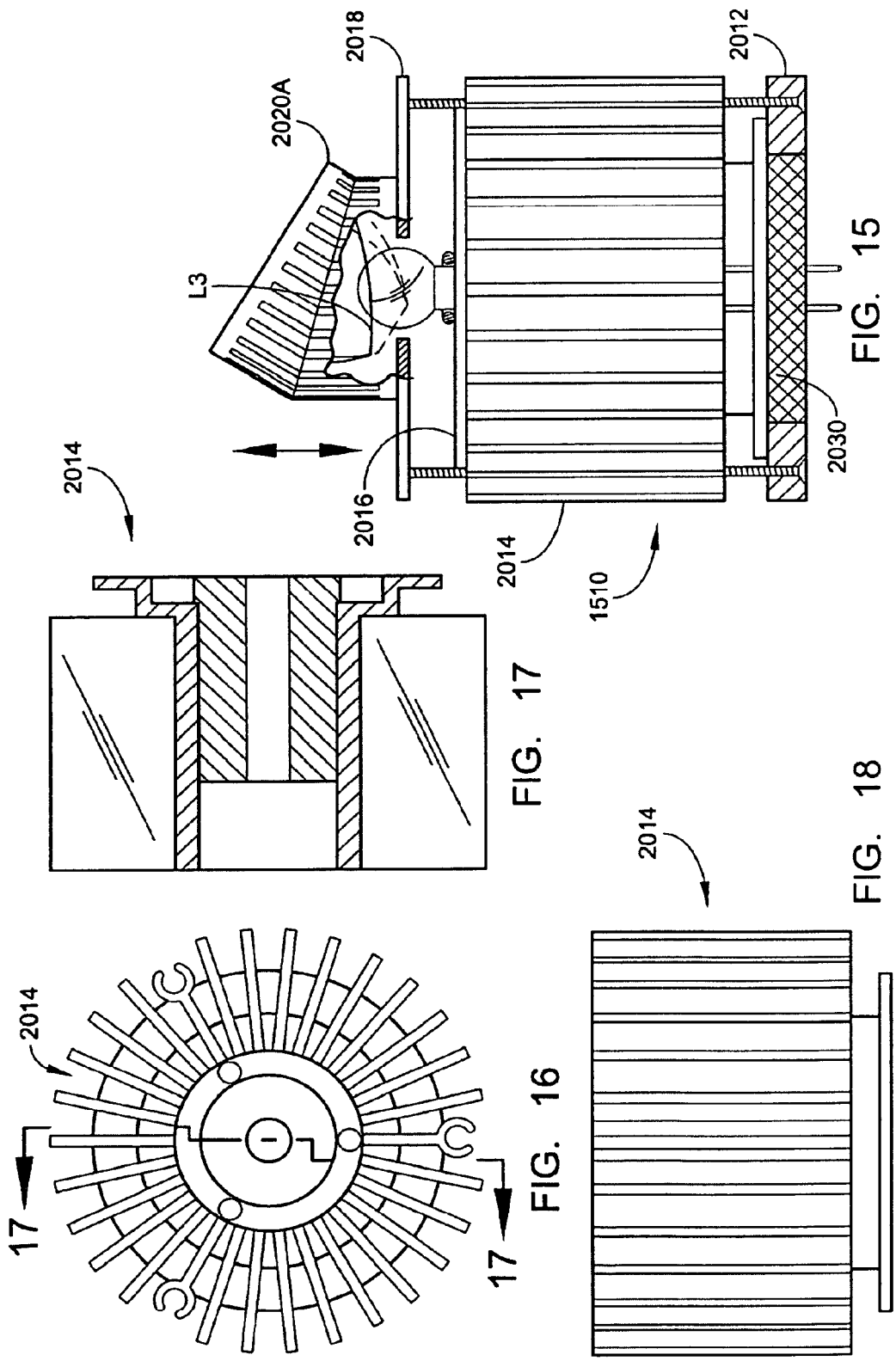

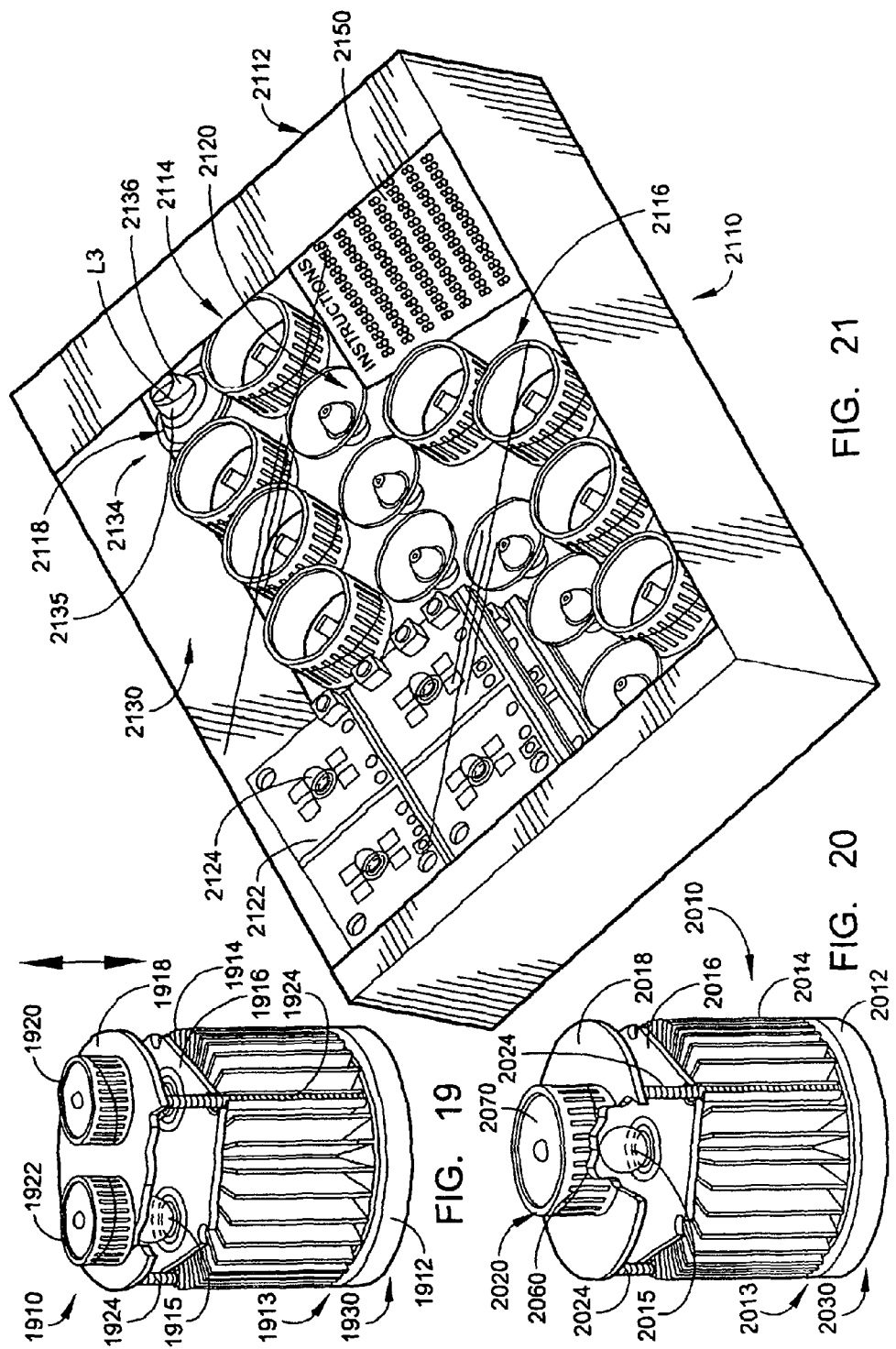

ADJUSTABLE LED LIGHTING SYSTEM, KIT AND METHOD OF USING SAME

CROSS-REFERENCE TO RELATED APPLICATIONS

This application is a non provisional continuation-in-part utility patent application of provisional application Ser. No. 61/057,858 entitled "LED ADJUSTABLE FOCUS LIGHTING SYSTEM," filed on Jun. 1, 2008.

BACKGROUND OF THE INVENTION

1. Field of the Invention

This application relates to adjustable lighting systems, lighting system kits, and methods for using the same. More particularly, this invention relates a to a light emitting diode lighting system, kit and method of using the kit to enable a user to customize light spread and distribution to illuminate an object within a field of view.

2. Background of Prior Art

Off road vehicles, military vehicles and similar vehicles and equipment need to illuminate large land areas with high intensity light in a fast and convenient manner. Therefore there is a need for a new and improved adjustable lighting system and lighting system kit for customizing a light spread and light distribution pattern across a desired field of view.

SUMMARY OF THE INVENTION

In a first preferred embodiment of the invention, an adjustable and customizable light emitting diode lighting system generally includes a primary holder for holding a plurality of matched pairs of breakaway light emitting diode assemblies to facilitate controlling a spread of light from a wide range angle Ø beam to a narrow range angle β beam and to further facilitate angling said spread of light from longitudinally straight forward or angled from longitudinally straight forward at a deviation angle θ of between about A degrees to about B degrees.

In a second preferred embodiment of the invention, a light emitting diode light system includes: 1. a heat sink assembly; 2. a lens assembly; and 3. a printed circuit board assembly which is sandwiched between the heat sink assembly and the lens assembly, where the lens assembly is mounted for both rectilinear movement toward and away from the printed circuit board assembly for light pattern focusing purposes and radial movement relative to the printed circuit board assembly for specific lens selection purposes.

In a third preferred embodiment of the invention, a light emitting diode lighting system includes: 1. a primary holder of a plurality of light emitting diode assemblies; 2. a secondary holder for mounting a plurality of break away lenses, wherein each individual lens is mounted for angular alignment with a corresponding individual one of the plurality of light emitting diode assemblies; and 3. wherein the secondary holder is adjustable to be spaced closer to or further away from said primary holder to facilitate controlling the spread of light emitted by the plurality of light emitting diode assemblies from a wide range angle Ø to a narrow range angle β and at individually user selected angles of inclination θ of between about A degrees to about B degrees.

In a fourth preferred embodiment of the invention, a light emitting diode lighting system includes: 1. a heat sink; 2. a printed circuit board which is coupled to the heat sink; 3. light emitting diode means which is coupled to the printed circuit board; 4. a housing platform which is mounted for rectilinear movement toward and away from the heat sink to facilitate controlling the spread of light emitted by the light emitting diode means from a wide range angle Ø to a narrow range angle β; 5. matched break away housing means which is coupled to said housing platform and mounted over the light emitting diode means; and 5. matched break away lens means which is pressed fit into the matched break away housing means to further facilitate controlling the spread of light emitted by the light emitting diode means from the wide range angle Ø to the narrow range angle β at a user selected breakaway angle θ of between about A degrees to about B degrees.

In a fifth preferred embodiment of the invention, a light emitting diode lighting system kit includes a plurality of matched pairs of breakaway light emitting diode assemblies adapted to be mounted in a primary lamp holder, and a set of assembly instructions. Each individual matched pair assembly includes: (1) a light emitting diode coupled to a printed circuit board; (2) a break away housing adapted to be pressed fit over the light emitting diode; and (3) a breakaway lens adapted to be pressed fit into the housing to facilitate controlling the spread of light emitted by said light emitting diode from a wide range angle Ø to a narrow range angle β at a user selected breakaway angle θ of inclination between about A degrees to about B degrees. The break away housing snaps apart into two portions which are rotatable 180 degrees relative to one another and then press fit together to form an angled housing having an inclined angle θ of between about 5 degrees to about 60 degrees. The break away lens includes a break away stem which when snapped apart results in a stem portion having an inclined angle θ of between about 5 degrees to about 60 degrees where its inclined angle θ is matched to the inclined angle θ of the break away housing.

BRIEF DESCRIPTION OF DRAWINGS

The above mentioned features and steps of the invention and the manner of attaining them will become apparent, and the invention itself will be best understood by reference to the following description of the embodiments of the invention in conjunction with the accompanying drawings wherein:

FIG. 2 is a pictorial view illustrating a light emitting diode printed circuit board assembly forming part of the light emitting diode lighting system of FIG. 1;

FIG. 3 is an exploded view of a light emitting diode assembly forming part of the printed circuit board assembly of FIG. 2;

FIG. 4 is a pictorial view of the light emitting diode assembly of FIG. 3;

FIG. 5 is a cross-sectional view of the light emitting diode assembly of FIG. 4 taken substantially along line 5-5;

FIG. 6 is a pictorial view illustrating another light emitting diode printed circuit board assembly forming part of the light emitting diode lighting system of FIG. 1;

FIG. 7 is an exploded view of the light emitting diode assembly forming part of the printed circuit board assembly of FIG. 6;

FIG. 8 is an exploded view of another light emitting diode printed circuit board assembly forming part of the light emitting diode lighting system of FIG. 12;

FIG. 9 is a is pictorial view of a printed circuit board forming part of the light emitting diode printed circuit board assembly of FIG. 8;

FIG. 10 is a is non exploded view of the light emitting diode printed circuit board assembly of FIG. 8, illustrating how its adjusted to spread or narrow its light distribution pattern in a focused manner.

FIGS. 11A-G, illustrated the angle range of the light spread patterns that can be set using the light emitting diode printed circuit board assembly of FIG. 8;

FIG. 12 is a pictorial view of a flood lamp lighting system which is constructed in accordance with the present invention;

FIG. 13 is a pictorial view of a flood lamp forming part of the lighting system of FIG. 1;

FIG. 14 is a pictorial view of a lens plate forming part of the flood lamp of FIG. 13;

FIG. 15 is a side elevational view of still another light emitting diode printed circuit board assembly forming part of the light emitting diode lighting system of FIG. 12;

FIG. 16 is a top plan view of a heat sink forming part of the light emitting diode printed circuit board assembly of FIG. 15;

FIG. 17 is a cross-sectional view of the heat sink of FIG. 16 taken substantially along line 17-17;

FIG. 18 is a side elevational view of the heat sink of FIG. 16;

FIG. 19 is a pictorial view of still another light emitting diode printed circuit board assembly forming part of the light emitting diode lighting system of FIG. 12;

FIG. 20 is a pictorial view of the light emitting diode printed circuit board assembly of FIG. 15; and FIG. 21 is a pictorial view of light emitting diode lighting system kit, which is constructed in accordance with another preferred embodiment of the present invention.

DETAILED DESCRIPTION OF THE PREFERRED EMBODIMENT

Figure 1:
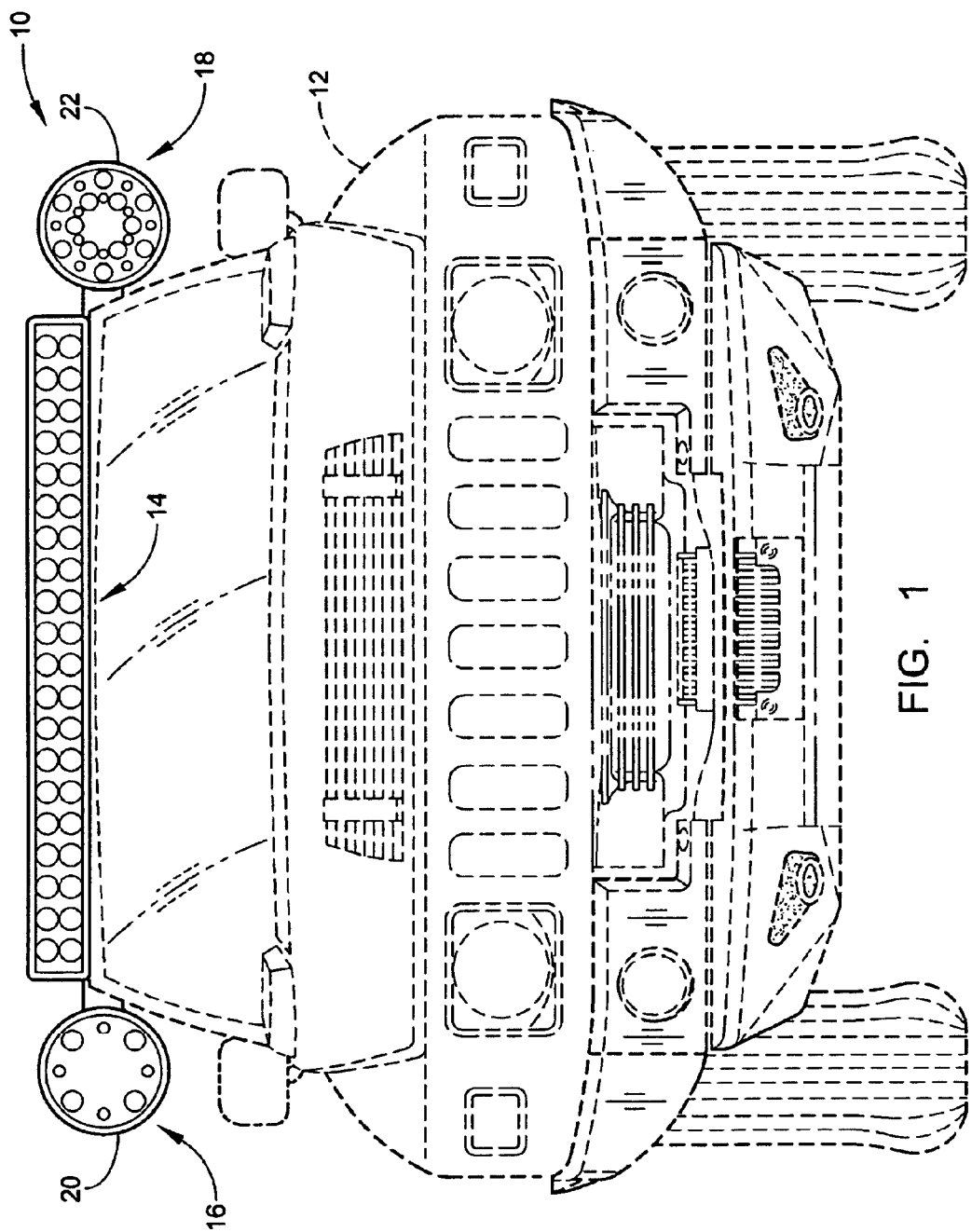
FIG. 1 is a pictorial view illustrating a vehicle having mounted thereon a light emitting diode lighting system which is constructed in accordance a preferred embodiment of the present invention.

Referring now to the drawings and more particularly to FIG. 1, there is illustrated an adjustable and customizable light emitting diode lighting system 10, which is constructed in accordance with the present invention. As best seen in FIG. 1, the lighting system 10 is mounted to a vehicle 12 which enables a vehicle driver (not shown) to customize and adjust the light pattern produced to by the lighting system 10 so that it illuminates large land areas with high intensity light in a fast and convenient manner. The lighting system 10 may be customizable to provide a lighting pattern having a wide spread angle Ø to a narrow spread angle β. In this regard, as best seen in FIGS. 11A-11E, the wide spread angle Ø can be varied between about 80 degrees to about 40 degrees, while the narrow spread angle β may be varied between about 8 degrees and about 20 degrees. The manner in which the light spread angle is varied will be described hereinafter in greater detail.

Before describing the light emitting diode system 10 in greater detail, it may be beneficial to briefly review the advantages afforded by this new and unique lighting system. To begin, the system 10 provides an inexpensive design for adjusting the light distribution pattern from the individual light emitting diode assemblies that are incorporated into the lighting system 10. In this regard, the system 10 enables a user, via a moveable lens arrangement, to adjust the light distribution pattern from a narrow light spread angle β to a wide spread angle Ø in a fast and convenient manner. The design functions by having customizable light emitting diode assemblies with individual light emitting diodes and lenses which may be disposed in various arrays, such as a linear array in a light bar arrangement 14 or in a spreading spot light array as provided by a wide angle flood lamp 16 as best seen in FIG. 1. Moreover, the direction angle of the light pattern may be customized at an inclination angle θ as will be described in greater detail.

To effect a distribution pattern adjustment, the user can adjust the spread of light by moving the orientation of the individual light emitting diodes and their corresponding lens from straight forward light pattern emissions to angled light pattern emission, where the angled light pattern emission can be selected to be between about 5 degrees to about 60 degrees relative to the mounting plane of the each base portion of the individual light emitting diode assemblies. In other words, as will be explained hereinafter in greater detail, this enhancement permits individual lenses to be torn away at a stem portion and then press fit into a housing which has a matched tear away configuration so that the housing and the lens can be customized for a specific angle to focus light from an associated light emitting diode at the specific formed breakaway angle θ.

In summary then, the advantages of the new and improved light emitting diode system include:

1. a compact design which takes little space;
2. a multi-lens arrangement inclusive of one or more lenses for pattern adjustments;
3. An adaptable system that works in both linear and circular arrays;
4. Adjustments or customization steps which are simple and easy to make;
5. A spread that can be changed at any time if the need for lighting changes;
6. A low cost system; and
7. A plurality of different types of light emitting diode assemblies for achieving different light patterns and light intensity outputs.

The above-mentioned advantages are achieved by a light emitting diode system where a light source in the form of light emitting diodes are mounted in a radial pattern on a printed circuit board and disposed below a lens array or lens assembly which generally includes one or more lens sets. The lens arrangement is mounted for rotational movement above the light emitting diodes so that multiple sets of lenses can be positioned above the light emitting diodes and thus, create multiple light output patterns. One of the primary innovation is a lens arrangement which generally includes a lens array positioned in radial patterns such that as the lens arrangement is rotated first one pattern is positioned over the light emitting diodes mounted within the system, and then a second array is positioned over the light emitting diodes to provide a second lighting pattern. This lens arrangement therefore allows a user to change from a narrow focus light pattern to a wide focus light pattern without having to purchase separate types of light systems. This arrangement also allows adjustment of the light output multiple times during use of the lighting system. The ability of a user to adjust the light output patterns after the light is installed in a key and important feature of the present invention.

From the foregoing, It should be understood by those skilled in the art that lenses can be easily replaced to provide lens arrays with different radial patterns, and then adjusted by mechanical means, such as a screwdriver blade, or electromechanical means, to achieve different light spreads in a fast and convenient manner.

Considering now the lighting system 10 in greater detail with reference to FIGS. 1-7, the lighting system 10 generally includes a plurality of individually adjustable light emitting diode printed circuit board assemblies, such a light emitting diode printed circuit board assembly 110 (FIG. 2) or a light emitting diode printed circuit board assembly 610 (FIG. 6)

and one or more primary holders, such as a primary holder 20, for mounting the light emitting diode printed circuit board assemblies 110, 610 in a linear array via the light bar arrangement 14, or in a circular or round array via the wide angle flood lamp 16, or a high intensity flood lamp 18. The light bar arrangement 14, the wide angle flood lamp 16 and the high intensity flood lamp 18 are each adapted to be mounted, on a stationary mounting surface, such as a wall, a roof, a upright stand, or on a vehicle, such as the vehicle 12, either individually or in combination with one another by mounting means (not shown). It is contemplated that expected embodiments of the lighting system 10 could be applied, without limitation, to recessed task lighting, work space lighting, under cabinet lighting, case lighting for consumer goods, sign lighting, museum lighting, indirect lighting of display items, artwork lighting, general room illumination, industrial task lighting for assembly work, warehousing, library cases, office cubicles, vehicle lighting, aircraft lighting, and any specialized light installation where the user needs to position the light in a compact and flexible way at the installation site.

Although the preferred embodiment of the present invention is described as having a particular light emitting diode printed circuit board assembly 110, it will become apparent to those skilled in the art, that other types of light emitting diode printed circuit board assemblies may also be employed within the system 10. In this regard, such other light emitting diode assemblies include a light emitting diode printed circuit board assembly 610 (FIG. 6), a light emitting diode printed circuit board assembly 810 (FIG. 8), a light emitting diode printed circuit board assembly 1010 (FIG. 10), a light emitting diode printed circuit board assembly 1110 (FIGS. 11A-G), a light emitting diode printed circuit board assembly 1510 (FIG. 15), a light emitting diode printed circuit board assembly 1910 (FIG. 19), and a light emitting diode printed circuit board assembly 2010 (FIG. 20), each of which will be described hereinafter in greater detail. Each of these light emitting diode printed circuit board assemblies have the ability to have not only their light output pattern ranges be adjusted between a wide angle output and a narrow angle output, but each also has the ability to have the direction of their light output patterns to be customized over a wide range of output angles in a fast and convenient manner which adjustment and customization abilities are important features of the present invention.

Considering now the light emitting diode printed circuit board assembly 110 in greater detail with reference to FIGS. 2-5, the light emitting diode printed circuit board assembly 110 generally includes a printed circuit assembly board 112, which includes a printed circuit board 113 having mounted thereon one or more light emitting diode assemblies, such as a light emitting diode assembly 114. Each individual light emitting diode assembly 114 is adapted to have its light output pattern direction customized from a light direction perpendicular to the printed circuit board 113 or at about an angle of θ degrees from perpendicular to the printed circuit board 113 as will be explained hereinafter in greater detail. For the moment it will suffice to mention that the angle θ is between about 5 degrees and about 60 degrees and is more preferable between about 30 degrees and about 50 degrees. The angle θ is most preferably at about 45 degrees.

Considering now the light emitting diode assembly 114 in greater detail with reference to FIGS. 2-5, the light emitting diode assembly 114 generally includes an electrical heat sink mount 116, a light emitting diode 118, a donut shaped housing mount 120, a break away or tear away housing 122 having a break away angle of about θ degrees, and a break away or tear away lens 124 having a corresponding break away or tear away angle of about θ degrees.

As will be explained hereinafter in greater detail, the break away angle θ of housing and the break away angle θ of the lens are matched and correspond to one another so the that the lens 124 can be press fit into the housing 122 and over the light emitting diode 118. More specifically as best seen in FIGS. 6 and 7, an angled light emitting diode assembly 114A can be easily and quickly configured when the housing 122 and lens 124 are torn away to provide an angle θ configuration. In this regard, the housing and lens combination can be customized to facilitate angling a spread of light from longitudinally straight forward or angled from longitudinally straight forward at a deviation angle θ of between about A degrees to about B degrees, where A degrees is about 5 degrees and where B is about 60 degrees.

As best seen in FIGS. 2 and 3, the electric mount 116 has a general circular shape having a centrally disposed circular cutout which is dimensioned for receiving therein the light emitting diode 118. In turn the electrical mount 116 and the light emitting diode 118 are coupled mechanically and electrically to the printed circuit board 113 in such a manner that the light emitting diode 118 is supported in an orientation that is perpendicular to the printed circuit board 113. Surrounding the circular cutout is the donut shaped housing mount 120. The housing mount 120 is dimensioned to receive thereon in a friction tight fit a mounting portion or cutout 121 of the housing 122 that will be described hereinafter in greater detail.

Considering now the housing 122 in greater detail with reference to FIGS. 2-5, the housing 122 has a cylinder like shape and includes a tear line L1 that permits the housing 122 to be easily and quickly snapped or torn apart into to two separate pieces as will be described hereinafter in greater detail. The housing 122 has a reflective coating 123 disposed on its inner surface to allow light from the light emitting diode 118 to be reflected off its inner wall surface into the lens 124. The bottom of the housing is closed except for a cutout 121 which is dimensioned to receive therein the light emitting diode 118 and to be pressed fit onto the donut shaped housing mount 120 in a friction tight fit for securing the housing to the printed circuit board 113. When the housing 122 in a non tear away form is mounted to the printed circuit board 113, light from the light emitting diode 118 is reflected from within the housing 122 and into the lens 124 for directing light perpendicular to the printed circuit board 113 as best seen in FIG. 2.

Considering now the a break away or tear away lens 124 in greater detail with reference to FIGS. 3 and 5, the lens 124 has an elongated shape which includes a circular cup shaped upper lens portion 130 and a conically shaped lower lens stem portion 132 where the upper lens portion 130 and the lower lens stem portion 132 are integrally attached to one another. The upper lens portion 130 is adapted to be pressed fit into the upper lens receiving portion 126 of the housing 122 while the lower lens portion 132 is adapted to be pressed fit onto the ball shaped light emitting diode 118 a best seen in FIG. 5.

Considering now the light emitting diode printed circuit board assembly 610, with reference to FIG. 6, the light emitting diode printed circuit board assembly 610 is substantially identical to light emitting diode printed circuit board assembly 110 except that the tear away housing and tear away lens are arranged in a tear away configuration. As the light emitting diode printed circuit board assembly 610 is substantially similar to assembly 110, only the tear away differences will be described hereinafter in greater detail.

Considering now the breakaway or tear away housing 122 in greater detail, the breakaway housing 122 is generally cylindrical in shape having an angled tear away line L₁ which effectively enables the housing 122 to be broken or snapped into two parts, into an upper lens receiving portion 126 and a lower mounting portion 128 as best seen in FIG. 7. In this regard, when the housing 122 is broken into two parts and the two portions 126 and 128 are rotated 180 degrees relative to one another along their respective longitudinal axis, the two portions 126 and 128 may then be pressed fit together to form an angled housing 122A (FIG. 7) having an inclined angle θ of between at about 5 degrees and at about 60 degrees. A more preferable angle θ is between at about 30 degrees and about 50 degrees, while the most preferred angle θ is at about 45 degrees. FIG. 2 illustrates the housing 122 mounted to the printed circuit board 113 in an unbroken state, whereas FIG. 6 illustrates the angled housing 122A in a broken and rotated state mounted to the printed circuit board 113.

It should be understood from the foregoing that if a user does not desire to break the housing 122 and reassembly the housing into an angled housing 122A, the user may mount the whole housing 122 onto the housing mount 120. In the regard, the housing 122 can be easily assembled to the housing mount 120 and the printed circuit board 113 in a fast and convenient manner. In a similar manner, the angled housing 122A may also be easily assembled to the housing mount 120 and the printed circuit board 113. Thus customization of the output light pattern direction from the light system 10 can be accomplished in a very fast and very convenient manner.

Considering now the a break away or tear away lens 124 in greater detail, the conically shaped lower lens portion 132 includes an angled tear away line L2 which effectively enables the lens 124 to be broken into two parts which includes a modified upper lens portion 134 and a throw away piece 136 which was previously part of the lower lens portion 132. The angled tear way line L2 is selected to have a matching angle to the tear away line L1 so that a resulting angled lens 124A with a modified lens portion 134 will be press fit and received in a friction tight fit within the upper housing portion 126 and angled to be received onto the light emitting diode 118 as best seen in FIGS. 6-7.

From the foregoing those skilled in the art should understand that the light stream emitting from the light emitting diode 118 may be directed in one of several different angles from a linear array of assemblies or from a circular array of assemblies. In order to change the angle of any one of the light emitting diode assemblies, a user need only snap off the housing and to replace the housing and lens with one having a desired angle of inclination, such as an angle θ, which can be selected to be anywhere between at about 5 degrees and at about 60 degrees. In this manner, the light array from the primary holder 20 can be customized over a wide range of different angles thereby giving the lighting system 10 the ability to illuminate a large field of view or a very narrow field of view at various inclination angles. This is an important feature of the present invention.

Considering now the wide angle flood lamp 16 in greater detail with reference to FIGS. 1, and 12, the wide angle flood lamp 16 generally includes a primary housing or holder 20 which is adapted to have mounted therein a plurality of high intensity light emitting diode printed circuit board assemblies, such as the light emitting diode printed circuit board assembly 810 as best seen in FIG. 8. The wide angle flood lamp 16 is configured so that its light output pattern can be customized or adjusted so that it illuminates large land areas with high intensity light in a fast and convenient manner. The wide angle flood lamp 16 may be customizable to provide a lighting pattern having a wide spread angle Ø to a narrow spread angle β. In this regard, as best seen in FIGS. 11A-11E, the wide spread angle Ø can be varied between about 80 degrees to about 40 degrees, while the narrow spread angle β may be varied between about 8 degrees and about 20 degrees. The manner in which the light spread angle is varied will be described hereinafter in greater detail.

Although the preferred embodiment of the present invention is described as having a particular light pattern as created by the light emitting diode printed circuit board assembly 810, other light patterns and ranges are possible, For example, the patterns generated by the light emitting diode printed circuit board assembly 1010 (FIG. 10), the light emitting diode printed circuit board assembly 1110 (FIGS. 11A-11G), the light emitting diode printed circuit board assembly 1510 (FIG. 15), the light emitting diode printed circuit board assembly 1910 (FIG. 19) and the light emitting diode printed circuit board assembly 2010 (FIG. 20), each of which will be described hereinafter in greater detail.

Considering now the light emitting diode printed circuit board assembly 810 in greater detail with reference to FIGS. 8-9, the light emitting diode printed circuit board assembly 810 generally includes a printed circuit board 812 having a plurality of light emitting diodes mounted thereon, such as a light emitting diode 818, a lens assembly 822, and a heat sink assembly 840. The plurality of light emitting diodes is mounted in a radial pattern array on the printed circuit board 812 with the lens assembly mounted directly above the printed circuit board 812.

As will be described hereinafter in greater detail, the assembly 810 is constructed for adjusting the light patterns produced by the assembly 810 in a fast and convenient manner. That is the light pattern can be angled from a straight perpendicular direction to the positive or the negative from perpendicular. The light spread pattern can also be adjusted from a narrow focus range to a wide focus range in a quick and easy manner. FIGS. 11A-11G illustrate the adjustment range of a light emitting diode printed circuit board assembly 1110 which is constructed similar to assembly 810 except that it employs a different light emitting diode array and corresponding lens array. Since the construction is similar except for the array layouts the printed circuit board assembly 1110 will not be described hereinafter in greater detail except as follows: it has a narrow focus range of between about 8 degrees and about 20 degrees and a wide focus range of between about 40 degrees and about 80 degrees. It also has an incline range of between about 1 degree and about 10 degrees. As noted earlier, the manner of adjusting the light pattern spread can be accomplished by hand with a screwdriver blade or with electromechanical means (not shown).

Considering now the heat sink assembly 840 in greater detail with reference to FIG. 8, the heat sink assembly 840 generally includes a heat sink mount 842, and a heat sink 844 having a centrally disposed hole 846. The heat sink mount 842 generally includes a mounting plate 848, having a centrally disposed upright spindle 850 integrally attached thereto. The spindle 850 is cylindrical in shape and is dimensioned to be received within the hole 846. A set of spaced apart threaded holes are disposed near the outer peripheral edge of the mounting plate 848 where the holes are dimensioned for receiving therein adjustment screws, such as an adjustment screw 852. Each adjustment screw, such as the adjustment screw 852 has a sufficient length to be extended upwardly a sufficient distance to engage the lens assembly 822. In this regard, a user by adjusting the individual screws 852 can set the lens assembly 822 on an inclined angle φ, where the angle φ is between about 1 degree and about 8 degrees. A more preferred angle φ is between about 2 degrees and about 7 degrees, and the most preferred angle φ is about 5 degrees.

As best seen in FIG. 8, the lens assembly 822 generally includes a mounting ring 824, and a lens mounting surface 826 having disposed thereon a plurality of lenses, such as a narrow focus lens 828 and a wide focus lens 830. The mounting ring 824 is mounted for rotational movement relative to the printed circuit board 812 so that the individual ones of the lens 828 and 830 can be rotated into vertical alignment with individual ones of the light emitting diodes. In this regard, as the lens assembly 822 is rotates above the light emitting diodes 818 multiple sets of lens are positioned above the light emitting diodes creating multiple light output patterns.

The primary innovation is a lens assembly that generally includes a minimum of two lens arrays positioned in a radial pattern such that as the mounting ring 824 is rotated to a first or narrow light focus pattern, such as the light focus pattern produced by the individual narrow focus lenses 828, positioning the first set of lens over the light emitting diodes on the printed circuit board 812, and then another light focus pattern, such as the wide focus pattern produced by the individual wide focus lens 830, is positioned over the light emitting diodes on the printed circuit board 812. In this manner, a user is allowed to change from a narrow focus light output pattern to a wide focus light output pattern without having to purchase separate types of light system. Moreover, this fast and convenient manner of changing the light output pattern can be accomplished as many times as may be needed by the user. This ability of the user to adjust the light output pattern after the assembly 810 has been installed is an important feature of the present invention.

From the foregoing, those skilled in the art will understand that by changing the mounting pattern for the individual ones of the light emitting diodes disposed on the printed circuit board 812 in combination with changing the mounting pattern for the individual ones of the lens disposed on the lens assembly 822, a variety of different types of lighting patterns can be easily and quickly achieved with the present invention. For example, with reference to FIG. 8 and the lens assembly 822, there is illustrated a lens layout that is configured to work with a light emitting diode array comprised of four light emitting diodes arranged in a circular pattern. In this regard, the lens assembly 822 has two sets of lens, a narrow focus set 828S and a wide focus set 838S. The first set 828S with a narrow light-spreading pattern can be positioned over the four light emitting diodes. Rotating the lens assembly 822 by 45 degrees positions the second set 838S with a wide light-spreading pattern can be positioned over the light emitting diodes.

Considering now the light emitting diode printed circuit board assembly 1010 in greater detail with reference to FIG. 10, the light emitting diode printed circuit board assembly 1010 generally includes a printed circuit board 1012 having a plurality of light emitting diodes mounted thereon, such as a light emitting diode 1018, a lens assembly 1022, and a heat sink assembly 1040. The plurality of light emitting diodes are mounted in a radial pattern array on the printed circuit board 1012 with the lens assembly 1022 mounted directly above the printed circuit board 1012. The heat sink assembly 1040 is constructed substantially the same as heat sink assembly 840. Therefore heat sink assembly 1040 will not be described hereinafter in greater detail.

Considering now the light emitting diode printed circuit board 1012 in greater detail with reference to FIG. 10, the light emitting diode printed circuit board 1012 is constructed substantially the same as printed circuit board 812 except that printed circuit board 1012 has a diode array layout that is different so that the diode arrangement corresponds with the lens arrangement on the lens assembly 1022 as will be explained hereinafter in greater detail.

As best seen in FIG. 10, the lens assembly 1022 includes a mounting ring 1024, and a lens mounting surface 1026 having disposed thereon a plurality of lens arranged in two concentric circles. This arrangement can be employed with a light emitting diode array of 2, 4, 6, or 8 individual light emitting diodes. On an inner portion of the mounting circle 1026 there is a first ring set of lens 1027S including a first set of narrow focus lenses, such as a narrow focus lens 1028 and a first set of wide focus lens, such as a wide focus lens 1030. On an outer portion of the mounting circle 1026, there is a second ring set of lens 1031S including a second set of narrow focus lens, such as a narrow focus lens 1032 and a second set of wide focus lens, such as a wide focus lens 1034.

Although two different printed circuit board and lens arrangements have been described in the preferred embodiment of the present invention, it should be understood by those skilled in the art that other board layout and lens layout arrangement are possible. FIGS. 11A-11G for example illustrate another lens layout that would function with the diode layout illustrated on printed circuit board 812. Other board layouts and diode layouts are contemplated as well. For example a board layout and lens layout where the diodes and lens are arranged in two concentric circles, a first wide angle circle of lens, and a second wide angle circle of lens, where both circles of lens are disposed around a centrally disposed single narrow focus lens. This arrangement can be employed with an outer light emitting diode circle array of 12 light emitting diodes and an inner light emitting diode circle array of 6 light emitting diode where each circle of light emitting diodes are disposed around a centrally disposed single high intensity light emitting diode. Based on the foregoing, there is no intention of limitations to the exact lens and light emitting diode layouts as disclosed herein this detailed description.

Considering now the high intensity flood lamp 18 in greater detail with reference to FIGS. 1, 13-14, the high intensity flood lamp 18 generally includes a primary housing 22, a printed circuit board assembly 24, and a lens plate assembly 26 (FIG. 14). The high intensity flood lamp 18 is configured so that its light output pattern can be customized or adjusted to illuminate large land areas with high intensity light in a fast and convenient manner. As will be explained hereinafter in greater detail, the high intensity flood lamp 18 may be customizable to provide a lighting pattern having a wide spread angle Ø to a narrow spread angle β. In this regard, the wide spread angle Ø can be varied between about 30 degrees to about 45 degrees, while the narrow spread angle β may be varied between about 5 degrees and about 20 degrees. The manner in which the light spread angle is varied will be described hereinafter in greater detail.

As best seen in FIG. 13, the primary housing 22 of the high intensity flood lamp 18 has generally a tear drop shape with a flat front open face area indicated generally at 28. The printed circuit board assembly 24 which is mounted in the front open face area 28 has mounted thereon a plurality of light emitting diodes, such as a light emitting diode 30. The light emitting diodes 30 are arranged in a predetermined pattern on the printed circuit board, so that the diodes mounted thereon will be arranged for alignment with a plurality of light directing lens which are disposed on the lens plate assembly 26. As will be explained hereinafter in greater detail, individual ones of the plurality of light directing lens, such as a light directing lens 32, and a light directing lens 34, are mounted in a customized arrangement that facilitates spreading light in a customized lighting pattern.

It should be understood by those skilled in the art, that with the ability to provide light emitting diodes arranged in a predetermined pattern on the printed circuit board, it is possible to customize the light pattern output using different lens arrangements. For example FIGS. 1 and 13-14 illustrate at least two different lens arrangements for providing customized light output patterns. Therefore, there is no intention of limitations to the exact lens and light emitting diode layouts as disclosed herein this detailed description.

The primary housing 22 includes a set of mounting screws, indicated generally at S, which are utilized to align and hang the lens plate assembly 26 to the primary housing 22. In this regard, the mounting screws S are loosely received within mounting or alignment holes, such as alignment hole 50, which are disposed about the periphery on the lens plate assembly 26 as will be described hereinafter in greater detail.

The primary housing 22 also includes a lens plate assembly alignment screw 36, which help secure the lens plate assembly 26 to the primary housing 22 and simultaneously enables the lens plate assembly 26 to be moved slight toward and slightly away from the printed circuit board assembly 24 in order to facilitate fine lens adjustments as needed. In this regard, the lens plate assembly 26 includes a centrally disposed mounting hole 38 which is dimensioned to receive therein the alignment screw 36.

Considering now the lens plate assembly 26 in greater detail with reference to FIG. 14, the lens plate assembly 26 generally includes a mounting plate 40 having mounted thereon a plurality of upstanding break away mounts, such as a breakaway lens mount 42 and a breakaway lens mount 44. Each breakaway mount, such as the mount 44, includes at least three upstanding break away legs 46, 47, and 48 respectively. Each break away leg is a graduated leg with a series of indicia marker, such as an indicia marker M that help facilitate configuring an associated mount so that it can receive and support therein in a friction tight fit manner a individual light directing lens at a precise incline of about a mounting angle θ. The mounting angle θ can be customized for each mount to be between about 5 degrees and about 60 degrees from the horizontal plane of the mounting plate 40. In this regard, the graduation indicia markers M on each leg are arrange for about a 5 degree adjustment for each segment torn away from an upstanding leg member. If none of the legs are broken away in a given mount, such as the mount 42, the lens mounted therein will be disposed parallel to the mounting plate 40 so the lens will mount directly onto its associated light emitting diode and light will be directed at 90 degrees to the plane of the mounting plate 40. Stated otherwise, the light beam will spread longitudinally straight forward.

Considering now the light directing lens 32 and 34 in greater detail with reference to FIG. 14, the lenses 32 and 34 are tear away lenses, where lens 32 is illustrated in a non tear away form and lens 34 is illustrated in a tear away form. As the lenses 32 and 34 are substantially similar to lens 124 and 124A previously described, the lenses 32 and 34 will not be described hereinafter in greater detail.

Referring now to the drawings and more particularly to FIG. 21 there is illustrated a customizing light emitting diode kit 2110, which is constructed in accordance with the following invention. The kit 2110 is for use with a primary housing or holder, such as the primary housings 20 and 22 for example, which are adapted to receive and have mounted therein various ones of the components found in the kit 2110 as will be explained hereinafter in greater detail. The kit 2110 also permits a user to customize and adjust the light pattern produced to by a lighting system which utilizes one or more of the same or different types of primary housings. In this regard for example, the kit 2110 when installed in the primary housing 22 will create a light output pattern that illuminates large land areas with high intensity light in a fast and convenient manner. The light output pattern may be customizable to provide a lighting pattern having a wide spread angle Ø to a narrow spread angle β. In this regard, the wide spread angle Ø can be varied between about 80 degrees to about 40 degrees, while the narrow spread angle β may be varied between about 8 degrees and about 20 degrees. The manner in which the light spread angle is varied will be described hereinafter in greater detail.

Considering now the kit 2110 in greater detail with reference to FIG. 21, the kit 2110 is packaged in a convenient container, such as a container 2112 which holds all of the component parts in a centralized location for easy access by a user. Within the container 2112, the component parts include a plurality of tear away lens holder housings, such as a lens holder housing 2114 and a lens holder housing 2116. The lens holders 2114 and 2116 are configured to be customized at different angles of inclination. For example, the lens holder 2114 is configured to be torn away and reconfigured to provide an angled housing with a first angle of inclination, while the lens holder 2116 is configured to be torn away and reconfigured to provide an angled housing with a second angle of inclination, where the first angle of inclination is about 5 degrees greater that the second angle of inclination. The kit 2110 may contain lens holders that provide angles of inclination of anywhere selected between about 5 degrees and about 60 degrees depending upon whether the kit is selected for wide angle illumination or narrow angle illumination.

As the manner of reconfiguring the individual lens holders 2114 and 2116 is substantially the same as previously described for lens holder 124 and 124A, the manner of reconfiguring lens holders 2114 and 2116 will not be described hereinafter in greater detail. Instead for the details one should refer to the description herein as it relates to lens holder housings 124 and 124A.

The kit 2110 also includes a plurality of tear away light directing lenses, such as a tear away lens 2118 and a tear away lens 2120. The tear away lenses 2118 and 2120 are configured to be customized at different angles of inclination, for example, the tear away lens 2118 is configured to be torn away to provide an angled lens with a third angle of inclination, while the tear away lens 2120 is configured to be town away to provide an angled lens with a fourth angle of inclination, where the third angle of inclination is about 5 degrees greater that the fourth angle of inclination. The kit 2110 may contain tear away lenses that provide angles of inclination of anywhere between about 5 degrees and about 60 degrees depending upon whether the kit is selected for wide angle illumination or narrow angle illumination.

Considering now the light directing lens 2118 and 2120 in greater detail with reference to FIG. 21, the lenses 2118 and 2120 are tear away lenses, where each lens is illustrated in a non tear away form. In this regard each lens may be reconfigured in substantially the same manner so-only the reconfiguring of lens 2118 will be described hereinafter in greater detail.

Considering now the light directing lens 2118 in greater detail the lens 2118 includes a scored stem portion indicated generally at 2130 and an upper lens portion 2134. The scored stem portion 2130 includes an upper stem portion 2135 and a stem lower portion 2136 which portions are separated from one another by a tear or score line indicated generally at $L_3$.

The score line $L_3$ is angled so that when a user grabs the upper stem portion 2135 and pulls and snaps or tears away the lower portion stem 2136, the lower stem portion 2136 separates and may be discarded leaving the lens 2118 with an angled stem portion having an angle of inclination of about $\theta_3$ where the angle of inclination of about $\theta_3$ is selected to correspond to the angle of inclination $\theta_1$ of a corresponding housing.

From the foregoing it should be understood by those skilled in the art that the kit 2110 includes lens holders and lens which are matched. That is the kit 2110 includes a first plurality of tear away lens holders with score lines having an angle of inclination θ1 matched with a first plurality of tear away lens with score lines having an angle of inclination θ3, where the angles of inclination θ1 and θ3 are matched so they correspond with one another. The kit 2110 further includes a second plurality of tear away lens holders with score lines having an angle of inclination θ2 matched with a second plurality of tear away lens with score lines having an angle of inclination θ4, where the angles of inclination θ2 and θ4 are matched so they correspond with one another. Depending upon the wide angle or narrow angle application for the kit 2110, the kit 2110 may contained a number of other tear away housing and tear away lenses which are matched at still different angles of inclination. Therefore there is no intention of limiting the kit to the angles of inclination described herein as other angles of inclination are contemplated within the true scope of the appended claims.

The kit 2110 also includes a set of printed circuit boards, such as a printed circuit board 2122, where each printed circuit board has mounted thereon a light emitting diode 2124. Each light emitting diode 2124 is a high intensity light emitting diode. A set of instruction 2150 is also included in the kit, which provides instructions for a user so that the user understand how to mount the printed circuit boards 2122 within the primary housing 22, and how to configure the individual one of the tear away lens housings and individual ones of the tear away lenses so they are configured for wide angle illumination or narrow angle illumination applications. In this regard, the instructions 2150 would typically include the following steps:

1. Mount the individual printed circuit boards 2122 in the primary housing 22 making certain there is an electrical connection made between the individual ones of the printed circuit boards 2122.

2. Temporarily apply power to the electrically connected printed circuit boards 2122 to make certain that each of their associated light emitting diodes 2124 illuminate properly.

3. Replace any light emitting diodes that are not operating properly and once all the light emitting diodes 2124 are operating properly disconnect the electrical power.

4. Select individual ones of the lens housings which provide the greatest angle of inclination for mounting on the printed circuit board.

5. Select corresponding individual ones of the tear away lens which provide the greatest angle of inclination for mounting within the housing selected in step 4.

6. As necessary, reconfigure the individual ones of the lens housings selected in step 4.

7. As necessary, reconfigure the individual ones of the lenses selected in step 5.

8. Mount the reconfigured lens housings from step 6 to selected ones of the light emitting diode as previously described herein relative to tear away housing.

9. Mount the reconfigured lenses from step 7 to the mounted reconfigured lens housing as described in step 8.

9. Select individual ones of lens housing which provide another but lesser angle of inclination for mounting on the printed circuit board.

10. Select corresponding other individual ones of the tear away lens which provide a matched angle of inclination relative to the housings selected in the previous step.

11. Reconfigure the individual ones of the lens housing selected in step 9.

12. Reconfigure the individual ones of the lenses selected in step 10.

13 Mount the reconfigured housing from step 11 to selected ones of the light emitting diodes as previously described herein relative to tear away housing.

14. Mount the reconfigured lenses from step 12 to the mounted reconfigured lens housing as described in step 13.

15. Repeat steps 9, 10, 11, 12, 13, and 14 until all matched tear away lens housings and tear away lens have been mounted to the remaining printed circuit boards and their corresponding light emitting diodes.

Considering now the light emitting diode printed circuit board assembly 1910 with reference to FIG. 19, the light emitting diode printed circuit board assembly 1910 is adapted to be mounted in a primary MR 16 lamp holder which MR 16 lamp holder is well known to those skilled in the art. Stated otherwise, the printed circuit board assembly 1910 is packaged as an MR 16 lamp replacement where the term MR 16 is a coded designation in which MR stands for Multifaceted Reflector and 16 is the number of eighths of an inch the front is in diameter, in the case of MR16: 2 inches.

It should be noted that MR16-compatible light emitting diode lamps are known in the prior art. They are similar in shape to halogen MR16 lamps, and can be used in most fixtures designed for MR16 lamps. For example reference may be made to U.S. Pat. No. 6,986,593 by Roads et al. issued on Jan. 17, 2006. The present invention is uniquely different however, from the '593 lamp as will be explained hereinafter in greater detail. For example, the printed circuit board assembly 1910, unlike the '593 lamp does not include a multifaceted reflector. In fact, the printed circuit board assembly 1910 does not include any type of reflector. Neither does the printed circuit board assembly 1910 include any special dichroic coatings that reflect particular frequencies of the visible spectrum. Yet due to the unique and novel structure of the printed circuit board assembly 1910 it is able to delivery different beam angles from a narrow spot of light as small as 5 degrees to a wide field flood lamp of at least 60 degrees in a highly efficient and cost effective manner.

As best seen in FIG. 19, the light emitting diode printed circuit board assembly 1910 generally includes a two pin electric connector mount 1912 coupled mechanically to a heat sink mounting plate 1913 for supporting thereon a heat sink 1914. The heat sink 1914 draws heat from a printed circuit board assembly 1916 carrying a plurality of light emitting diodes, such as a light emitting diode 1915. Mounted over the light emitting diodes is a lens assembly mount 1918 which supports from below a plurality of customizable or tear away lens assemblies, such as a customizable lens assembly 1920 and a customizable lens assembly 1922. The tear away lens assemblies enable the light pattern for the assembly 1910 to be easily customized to a narrow beam application to a wide flood beam application as will be explained. For the moment it will suffice to mention, since the two pin electric connector mount 1912 is a conventional MR 16 type connector mount, it will not be described hereinafter in greater detail but to mention that it includes a set of thread holes spaced about its periphery for receiving therein elongated adjustment screws such as an adjustment screw 1924. The adjustment screws 1924 have sufficient lengths to raise and lower the lens assembly mount 1918 for beam adjustment purposes.

The two pin electrical connector mount 1919 is coupled electrically to the printed circuit board assembly 1916 which is mounted to the top surface area of the heat sink 1914 and spaced from the lens assembly mount 1918 by a sufficient distance to facilitate beam focusing purposes as will be explained. The electrical connector mount 1919 is isolated electrically from the heat sink mounting plate 1913 and the heat sink 1914 supported thereon. In this manner, electrical current can be easily and safely transferred from the mount 1919 to the printed circuit board assembly 1916 and the light emitting diodes mounted thereon, such as the light emitting diodes 1915.

Considering now the lens assembly mount 1918 in greater detail, the lens assembly mount 1918 is supported from below by the elongated adjustment screws 1924 so that the lens assembly mount 1918 may be moved closer to or further away from the printed circuit board assembly 1916. This is an important feature of the present invention as this allows a focus adjustment for the assembly 1910 by moving the tear away lens assemblies 1920 and 1922 closer to or further away from their associated light emitting diodes 1930.

The lens assembly mount 1918 is generally circular in configuration having a diameter that is substantially the same as the heat sink 1914 and the two pin electrical connector mount 1919 to provide the overall configuration of the light emitting diode printed circuit board assembly 1910 with a configuration which is compatible with the MR16 lamp configurations. The lens assembly mount 1918 is adapted to have mounted thereon so as to support from below at least a pair of the customizable or tear away lens assemblies, such as the lens assembly 1920 and the lens assembly 1922.

Considering now the lens assemblies 1920 and 1922 in greater detail, the lens assemblies 1920 and 1922 are substantially identical so only lens assembly 1920 will be described in greater detail. Lens assembly 1920 generally includes a breakaway housing 1960 and a breakaway lens 1970. The breakaway housing 1960 and the breakaway lens are matched to have substantially the same break away angle of inclination θ, which angle of inclination θ is between about 5 degrees and about 60 degrees. The break away housing 1960 is substantially similar to break away angled housing 122A and therefore breakaway housing 1960 will not be described hereinafter in greater detail. In a similar manner, break away lens 1970 is substantially similar to break away lens 124 and therefore break away lens 1970 will not be described hereinafter in greater detail.

The manner in which the break away housing 1960 is configured into an angle housing is substantially similar to the manner in which break away angled housing 122A is configured into an angle housing. Similar the manner in which the break away lens 1970 is configured into an angled lens is substantially similar to the manner in which break away lens 124 is configured into an angled lens 124A. Therefore the manner in which the break away housing 1960 and the manner in which the break away lens 1970 are configured into an angled housing and an angled lens will not be described hereinafter in greater detail.

Although in the preferred embodiment only a pair of the lens assemblies 1920 and 1922 are illustrated as being mounted on the top surface of the lens assembly mount 1918, it should be understood by those skilled in the art that fewer lens assemblies or a greater number of lens assemblies may be mounted within the available mounting area of the lens assembly mount 1918.

Considering now the light emitting diode printed circuit board assembly 1910 in still greater detail, the printed circuit board assembly 1916 is matched to the number of lens assemblies which are disposed on the lens assembly mount 1918. That is, since the lens assembly mount 1918 is configured to support from below two lens assemblies 1920 and 1922, the printed circuit board assembly 1916 is configured with two light emitting diodes, such as a light emitting diode 1930.

Considering now the method of focusing the light patterns generated by the light emitting diodes 1930 in greater detail with reference to FIG. 19, the lens assembly mount 1918 is mounted closely spaced apart from the printed circuit board assembly 1916. For clarity of understanding the focusing method, the lens assembly mount 1918 in FIG. 19 is illustrated at a maximum spaced position from the printed circuit board assembly 1916, which is a first adjustment position. A user by adjusting the focus adjustment screws 1924 decreases the spacing distance between the lens assemblies 1920 and 1922 and the printed circuit board assembly 1916 so that the distance between the lens 1970 carried on the break away housing 1960 and 1962 is adjusted to a second adjustment position which is a focus position so that the generated light patterns are in focus. It should be understood that the travel distance between the lens assembly mount 1918 and the printed circuit board assembly 1916 and its associated light emitting diodes 1930 is sufficiently small that only a minor adjustment of the adjustment screws 1924 is required for pattern focusing purposes.

Considering now the light emitting diode printed circuit board assembly 2010 with reference to FIG. 20, the light emitting diode printed circuit board assembly 2010 generally includes a heat sink mount 2012, a heat sink mounting plate 2013, a heat sink 2014, a printed circuit board assembly 2016, a lens assembly mount 2018, and a customizable lens assembly, such as a customizable lens assembly 2020. Light emitting diode printed circuit board assembly 2010 is substantially similar in configuration to light emitting diode printed circuit board assembly 1910 except that it is configured with only a single light emitting diode 2015 on printed circuit board assembly 2016 and only the single customizable lens assembly 2020. Therefore the light emitting diode printed circuit board assembly 2010 will not be described hereinafter in greater detail, except to further describe the customizable lens assembly 2020.

Considering now the customizable lens assembly 2020, the customizable lens assembly 2020 generally includes a breakaway housing 2060 and a breakaway lens 2070. The breakaway housing 2060 and the breakaway lens 2070 are matched to have substantially the same break away angle of inclination θ, which angle of inclination θ is between about 5 degrees and about 60 degrees. The break away housing 2060 is substantially similar to break away housing 122 and therefore breakaway housing 2060 will not be described hereinafter in greater detail. In a similar manner, break away lens 2070 is substantially similar to break away lens 124 and therefore break away lens 2070 will not be described hereinafter in greater detail.

It should be understood by those skilled in the art that the various light emitting diode printed circuit board assemblies, such as assemblies 1510, 1910, and 2010 for example, have low voltage light emitting diodes. In order to convert a primary power source, whether its 110 VAC, 220 VAC or some other alternating current voltage value, a converter or voltage driver, such as a converter 1930, or a converter 2030 can be mounted below associated heat sinks, such as heat sink 2014, 1914, and 2014 respectively. In this manner the light emitting diode printed circuit board assemblies may operate with constant current and or low voltage 12V, 24V, 48 V AC or DC low voltage as needed. Assemblies can have direct wires or pin connectors or direct screw in sockets such as one would find on a conventional light blub. Moreover, it should be understood that such converters may be mounted apart from such assemblies in a remote junction box for example. In short then, the converters 1930 and 2030 enable the assemblies to run universal power 90 volts, 120 volts, 240 volts, 277 volts or 480 as required and needed in universal power applications. As such converters or voltage drivers are well known in the prior art, the converters 1930 and 2030 will not be described hereinafter in greater detail.

While a particular embodiment of the present invention has been disclosed, it is to be understood that various different modifications are possible and are contemplated within the true spirit and scope of the appended claims. For example, it is contemplated that the lens assembly 822 can be configured to rotate by application of a tool or by hand requiring no tools. Detents can also be included to provide a user with feedback that the lens assembly is positioned optimally over the light emitting diode array. A pattern of one, two, three, four or any integer number of lenses is possible matched to a light emitting diode array disposed on the printed circuit board assembly. The lens assembly is free to rotate over the light emitting diode array and is free to be adjusted to be inclined at about an angle ϕ. As another example, the light emitting diode system 10 may also includes means for adjusting the intensity of the light emitted by the system 10 so that it may varied from a fully on state to a fully off state in a series of dimming steps. In this regard it is contemplated that the intensity of the light emitting diode may be dimmed from a fully on state to a plurality of intermediate states arranged in about 10 percent steps including about 100 percent off, 90 percent off, 80 percent off, 70 percent off, 60 percent off, 50 percent off, 40 percent off, 30 percent off, 20 percent off, and 10 percent off. As still yet another example, the lens assembly 2020 may be reconfigured into an angle assembly 2020A as best seen in FIG. 15 to provide yet another light emitting diode printed circuit board assembly 1510 which is adapted to be mounted in a primary MR 16 lamp holder. Therefore, there is no intention of limitations to the exact abstract or disclosure herein presented.

REFERENCE CHARACTER LISTING

M an indicia marker
S mounting screw
10 an adjustable and customizable light emitting diode lighting system (FIG. 1)
12 a vehicle
14 a light bar arrangement
16 a wide angle flood lamp
18 a high intensity flood lamp
20 a primary housing
22 a primary housing
24 a printed circuit board assembly
26 a lens plate assembly (FIG. 14)
28 a flat front open face
30 a light emitting diode
32 a light directing lens
34 a light directing lens
36 a lens plate assembly alignment screw
38 a centrally disposed mounting hole
40 a mounting plate
42 a lens mount
44 a lens mount
110 a light emitting diode printed circuit board assembly (FIG. 2)
112 a printed circuit board assembly (FIG. 2)
113 a printed circuit board
114 a light emitting diode assembly (FIGS. 2-3)
114A an angled light emitting diode assembly (FIGS. 6-7)
116 an electrical mount
118 a light emitting diode
120 a housing mount
121 a mounting portion or cutout
122 a break away or tear away housing
122A an angled housing
123 a reflective coating
124 a break away or tear away lens
124A a resulting angled lens 124A
126 an upper lens receiving portion
128 a lower mounting portion
130 an upper lens portion
132 a lower lens portion
134 a modified upper lens portion
136 a throw away lens piece
810 a light emitting diode printed circuit board assembly (FIG. 8)
812 a printed circuit board
818 a light emitting diode
822 a lens assembly
824 a mounting ring
826 a lens mounting surface
828 a narrow focus lens
828S a narrow focus set
830 a wide focus lens
838S a wide focus set
840 a heat sink assembly
842 a heat sink mount
844 a heat sink
848 a mounting plate
850 an upright spindle
852 a screw
1010 a light emitting diode printed circuit board assembly (FIG. 10)
1012 a printed circuit board
1018 a light emitting diode
1022 a lens assembly
1024 a mounting ring
1026 a lens mounting surface or circle
1027S a first ring set of lens
1028 a narrow focus lens
1030 a wide focus lens
1031S a second ring set of lens
1032 a second set of narrow focus lens
1034 a wide focus lens
1040 a heat sink assembly
1510 a light emitting diode printed circuit board assembly (FIG. 15)
1910 a light emitting diode printed circuit board assembly (FIG. 19)
1912 a two pin electric connector mount
1913 a heat sink mounting plate
1914 a heat sink
1916 a printed circuit board assembly
1915 a light emitting diode
1918 a lens assembly mount
1920 a customizable lens assembly
1922 a customizable lens assembly
1924 an adjustment screw
1930 a converter or voltage driver
1960 a breakaway housing 1970 a breakaway lens
2010 a light emitting diode printed circuit board assembly (FIG. 20)
2012 a heat sink mount
2013 a heat sink mounting plate
2014 a heat sink
2015 a light emitting diode
2016 a printed circuit board assembly
2018 a lens assembly mount
2020 a customizable lens assembly
2020A an angle assembly
2030 a converter or voltage driver
2060 a breakaway housing
2070 a breakaway lens
2110 a customizing light emitting diode kit
2112 a container
2114 a lens holder housing
2116 a lens holder housing
2118 a tear away lens
2120 a tear away lens
2122 a printed circuit board
2124 a light emitting diode
2130 a scored stem portion
2134 an upper lens portion
2135 an upper stem portion
2136 a lower stem portion
2150 a set of instruction

I claim:

1. A light emitting diode lighting system comprising:
a primary holder for holding a plurality of matched pairs of breakaway light emitting diode assemblies to facilitate controlling a spread of light from a wide range angle Ø beam to a narrow range angle β beam and to further facilitate angling said spread of light from longitudinally straight forward or angled from longitudinally straight forward at a deviation angle θ of between about A degrees to about B degrees;
wherein each individual matched pair of breakaway light emitting diode assemblies includes:
a printed circuit board assembly having at least one light emitting diode disposed thereon for producing a beam of light;
a breakaway housing disposed above said at least one light emitting diode to customize angling said beam of light from longitudinally straight forward or angled from longitudinally straight forward at another deviation angle θ of between about A degrees to about B degrees;
a break away lens assembly mounted on said breakaway housing to facilitate controlling the spread of said beam of light from a wide range angle Ø beam to a narrow range angle β beam;
wherein said breakaway housing breaks into two portions which are rotatable 180 degrees relative to one another; and
said two portions adapted to be pressed press fit together to form an angled housing having an inclined angle θ of between about A degrees to about B degrees.

2. The light emitting diode lighting system according to claim 1, wherein said inclined angle θ of between about A degrees to about B degrees is between about 5 degrees and about 60 degrees.

3. The light emitting diode lighting system according to claim 2, wherein a more preferred inclined angle θ is between about 30 degrees to about 50 degrees.

4. The light emitting diode lighting system according to claim 3, wherein a most preferred inclined angle θ is about 45 degrees.

5. The light emitting diode lighting system according to claim 1, wherein said primary holder is a light bar.

6. The light emitting diode lighting system according to claim 1, wherein said primary holder is a flood light having a tear drop configuration.

7. A light emitting diode lighting system, comprising:
a primary holder for holding a plurality of light emitting diode assemblies to facilitate controlling a spread of light from a wide range angle Ø beam to a narrow range angle β beam;
wherein each individual one of said light emitting diode assemblies includes:
a heat sink;
a printed circuit board mounted to said heat sink;
a plurality of light emitting diodes coupled electrically and mechanically to said printed circuit board; and
a lens assembly mounted above said printed circuit board for rotational movement relative to said plurality of light emitting diodes to facilitate controlling the spread of light emitted by said light emitting diode means from said wide range angle Ø beam to said narrow range angle β beam;
wherein said lens assembly is further mounted for rectilinear movement relative to said printed circuit board to facilitate controlling the focus of the spread of light;
wherein said lens assembly includes a plurality of lenses arranged in a circular pattern;
wherein said plurality of lens includes:
a first plurality of wide angle lenses corresponding in number to said plurality of light emitting diodes; and
a second plurality of narrow angle lenses corresponding in number to said plurality of light emitting diodes.

8. A light emitting diode lighting system, comprising:
a primary holder for holding a plurality of light emitting diode assemblies to facilitate controlling a spread of light from a wide range angle Ø beam to a narrow range angle β beam;
wherein each individual one of said light emitting diode assemblies includes:
a heat sink;
a printed circuit board mounted to said heat sink;
a plurality of light emitting diodes coupled electrically and mechanically to said printed circuit board; and
a lens assembly mounted above said printed circuit board for rotational movement relative to said plurality of light emitting diodes to facilitate controlling the spread of light emitted by said light emitting diode means from said wide range angle Ø beam to said narrow range angle β beam;
wherein said lens assembly is further mounted for rectilinear movement relative to said printed circuit board to facilitate controlling the focus of the spread of light;
wherein said lens assembly includes a plurality of lenses arranged in two concentric circles;
wherein the two concentric circles include:
an inner circle having a first set of narrow focus lenses and a first set of wide focus lenses; and
an outer circle having a second set of narrow focus lenses and a second set of wide focus lenses.

9. The light emitting diode lighting system according to claim 8, wherein said wide range angle Ø is between about 40 degrees and about 80 degrees.

10. The light emitting diode lighting system according to claim 9, wherein said narrow range angle β is between about 8 degrees and about 20 degrees.

11. The light emitting diode lighting system according to claim 8, wherein said primary holder is a light bar.

12. The light emitting diode lighting system according to claim 8, wherein said primary holder is a flood light having a tear drop configuration.

13. A light emitting diode lighting system, comprising:
   a primary holder of a plurality of light emitting diode assemblies;
   a secondary holder for mounting a plurality of break away lenses, wherein each individual lens is mounted for angular alignment with a corresponding individual one of said plurality of light emitting diode assemblies;
   wherein said secondary holder is adjustable to be spaced closer to or further away from said primary holder to facilitate controlling the spread of light emitted by said plurality of light emitting diode assemblies from a wide range angle Ø to a narrow range angle β;
   wherein each individual one of said plurality of break away lenses is configured to snap apart along a score line having an inclined angle θ of between about A degrees to about B degrees to provide an angled lens and a throw away lens stem portion.

14. The light emitting diode lighting system according to claim 13, wherein said inclined angle θ of between about A degrees to about B degrees is between about 5 degrees and about 60 degrees.

15. The light emitting diode lighting system according to claim 14, wherein a more preferred inclined angle θ is between about 30 degrees to about 50 degrees.

16. The light emitting diode lighting system according to claim 15, wherein a most preferred inclined angle θ is about 45 degrees.

17. The light emitting diode lighting system according to claim 13, wherein said primary holder is a light bar.

18. The light emitting diode lighting system according to claim 13, wherein said primary holder is a flood light having a tear drop configuration.

19. A light emitting diode lighting assembly, comprising:
   a heat sink;
   a printed circuit board mounted to said heat sink;
   light emitting diode means coupled to said printed circuit board;
   a housing platform mounted for rectilinear movement toward and away from said heat sink to facilitate controlling the spread of light emitted by said light emitting diode means from a wide range angle Ø to a narrow range angle β;
   housing means coupled to said housing platform and mounted over said light emitting diode means;
   lens means press fit into said housing means to further facilitate controlling the spread of light emitted by said light emitting diode means from said wide range angle Ø to said narrow range angle β;
   wherein said housing means is a tear away housing means to facilitate angling a stream of light from said light emitting diode means relative to said printed circuit board; and
   wherein said tear away housing means breaks into two portions which are rotatable 180 degrees relative to one another and then press fit together to form angled housing means having an inclined angle θ of between about A degrees to about B degrees.

20. The light emitting diode lighting assembly according to claim 19, wherein said lens means includes tear away stem means to further facilitate spreading said stream of light from said light emitting diode means over said wide range angle Ø to said narrow range angle β.

21. The light emitting diode lighting assembly according to claim 19, wherein said light emitting diode means is a plurality of light emitting diodes.

22. The light emitting diode lighting assembly according to claim 19, wherein said light emitting diode means is a single light emitting diode.

* * * * *

UNITED STATES PATENT AND TRADEMARK OFFICE
CERTIFICATE OF CORRECTION

| | | |
|---|---|---|
| PATENT NO. | : 8,061,868 B2 | Page 1 of 1 |
| APPLICATION NO. | : 12/386545 | |
| DATED | : November 22, 2011 | |
| INVENTOR(S) | : Jack Dubord | |

It is certified that error appears in the above-identified patent and that said Letters Patent is hereby corrected as shown below:

Column 1, line 42, "light" should be changed to --lighting--.

Column 2, line 6, "5" should be changed to --6--.

Column 2, line 65, "is a is" should be changed to --is a--.

Column 3, line 1, "is a is" should be changed to --is a--.

Column 3, line 5, "illustrated" should be changed to --illustrates--.

Column 3, line 43, "produced to by" should be changed to --produced by--.

Signed and Sealed this
Twenty-first Day of February, 2012

David J. Kappos
*Director of the United States Patent and Trademark Office*